US011465684B2

United States Patent
Okamoto et al.

(10) Patent No.: US 11,465,684 B2
(45) Date of Patent: Oct. 11, 2022

(54) FRONT SUSPENSION APPARATUS

(71) Applicant: MAZDA MOTOR CORPORATION, Hiroshima (JP)

(72) Inventors: Hiroyuki Okamoto, Aki-gun (JP); Fumihiro Kurohara, Aki-gun (JP); Ippei Kuroda, Aki-gun (JP); Yasunori Takahara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 181 days.

(21) Appl. No.: 16/929,219

(22) Filed: Jul. 15, 2020

(65) Prior Publication Data
US 2021/0024135 A1 Jan. 28, 2021

(30) Foreign Application Priority Data
Jul. 24, 2019 (JP) .............................. JP2019-135937

(51) Int. Cl.
*B62D 21/11* (2006.01)
*B62D 21/15* (2006.01)
(Continued)

(52) U.S. Cl.
CPC ............ *B62D 21/11* (2013.01); *B62D 21/155* (2013.01); *B60G 7/001* (2013.01);
(Continued)

(58) Field of Classification Search
CPC ........ B62D 21/155; B62D 7/18; B62D 17/00; B62D 21/183; B60G 7/008; B60G 2204/129; B60G 2206/50; B60G 2200/44; B60G 2200/46; B60G 2204/143; B60G 2204/4302; B60G 2204/4308;
(Continued)

(56) References Cited

U.S. PATENT DOCUMENTS 5,385,369 A * 1/1995 Mukai ...................... B60G 7/00
280/788
9,150,252 B2 * 10/2015 Yasui ....................... B60G 7/02
(Continued)

FOREIGN PATENT DOCUMENTS

JP  2015-157539 A  9/2015
JP  2018-188039 A  11/2018
(Continued)

*Primary Examiner* — Darlene P Condra
(74) *Attorney, Agent, or Firm* — Studebaker & Brackett PC

(57) ABSTRACT

A front suspension apparatus in which a front side of a suspension arm can be cut off from a subframe at the time of a small overlap collision without a complication of structure and formability. A front suspension apparatus in which a lower arm from which a front wheel is suspended is provided, and a front arm portion and a rear arm portion of the lower arm are axially supported by axially supporting portions of a subframe is characterized in that an axially supporting portion of the front arm portion is joined to the subframe at a joined portion extending in a vehicle width direction, a joined portion extending in an up-down direction, and a joined portion extending in a front-rear direction, and a joining strength of a joined portion in the front-rear direction is lower than a joining strength of the joined portion in the up-down direction.

11 Claims, 12 Drawing Sheets

(51) Int. Cl.
  *B60G 7/00* (2006.01)
  *B62K 25/24* (2006.01)
(52) U.S. Cl.
  CPC .... *B60G 2204/143* (2013.01); *B60G 2204/15* (2013.01); *B60G 2206/016* (2013.01); *B60G 2206/122* (2013.01); *B62K 25/24* (2013.01)
(58) Field of Classification Search
  CPC ........ B60G 2206/8201; B60G 2206/91; B60G 2206/911; B60G 2300/07; B60G 7/02
  See application file for complete search history.

(56) References Cited

U.S. PATENT DOCUMENTS

| | | | |
|---|---|---|---|
| 10,864,790 B2 * | 12/2020 | Behn | B60G 7/02 |
| 2008/0048409 A1 * | 2/2008 | Takahashi | B60G 7/02 |
| | | | 280/124.109 |
| 2014/0312654 A1 * | 10/2014 | Komiya | B62D 21/155 |
| | | | 296/187.09 |
| 2018/0273098 A1 * | 9/2018 | Komiya | B62D 21/155 |
| 2020/0102013 A1 * | 4/2020 | Sakai | B60G 7/001 |

FOREIGN PATENT DOCUMENTS

| | | | | |
|---|---|---|---|---|
| WO | WO-2010053082 A1 * | 5/2010 | | B60G 7/001 |
| WO | WO-2019112029 A1 * | 6/2019 | | B60G 13/003 |

* cited by examiner

FRONT SUSPENSION APPARATUS

BACKGROUND

Technical Field

The present disclosure relates to a front suspension apparatus in which a front arm portion and a rear arm portion of a suspension arm are axially supported by axially supporting portions of a subframe.

Background Art

In general, states of a frontal collision include a full-overlap collision, an offset collision, and a small overlap collision. The small overlap collision is a collision in which a collision load is not input to a front side frame and a subframe, and a front wheel moves backward to the vehicle rear side together with a wheel well.

As a structure for taking measures against the small overlap collision, the following structure is known. Put plainly, when the collision load is input to the front wheel, a front connecting portion of the suspension arm is cut off from the subframe and the suspension arm is rotationally moved to the vehicle-width-direction outer side about a rear connecting portion, to thereby increase the distance between an own vehicle and a collision object.

Specifically, as disclosed in Japanese Patent Laid-Open No. 2015-157539, the front connecting portion of a lower arm with respect to the subframe is formed in a C-shape in front view. In this related-art structure, at the time of a small overlap collision, the C-shaped front connecting portion is pulled out from the subframe. However, in this related-art structure, the complication of the structure and the formability is caused, and hence there has been room for improvement.

Japanese Patent Laid-Open No. 2018-188039 discloses the following structure. Put plainly, a lower arm includes a front connecting portion and a rear connecting portion axially supported by a subframe. The lower arm includes a first arm portion extending in the front-rear direction and a second arm portion extending in the vehicle width direction. In this related-art structure, at the time of a small overlap collision, the second arm portion is broken off to the front-rear direction from a fragile portion thereof serving as a starting point. However, this related-art structure is not preferable because the structure becomes complicated and the suspension performance is affected.

SUMMARY

Thus, the present disclosure provides a front suspension apparatus in which the front side of the suspension arm can be cut off from the subframe at the time of a small overlap collision without causing the complication of the structure and the formability.

In a front suspension apparatus according to the present disclosure, a suspension arm from which a front wheel is suspended is provided, a front arm portion and a rear arm portion of the suspension arm are axially supported by axially supporting portions of a subframe. The axially supporting portion for the front arm portion is joined to the subframe at a joined portion extending in a vehicle width direction, a joined portion extending in an up-down direction, and a joined portion extending in a front-rear direction, and the joined portion in the front-rear direction has a joining strength that is lower than a joining strength of the joined portion in the up-down direction.

The suspension arm described above may be set to be an A-type lower arm. According to the configuration above, the front side of the suspension arm can be cut off from the subframe at the time of a small overlap collision by reducing the joining strength of the joined portion in the front-rear direction of the front arm portion with respect to the axially supporting portion on the subframe side without causing the complication of the structure and the formability.

In a front suspension apparatus according to the present disclosure, a suspension arm from which a front wheel is suspended is provided, a front arm portion and a rear arm portion of the suspension arm are axially supported by axially supporting portions of a subframe, the axially supporting portion for the front arm portion is joined to the subframe at a joined portion extending in a front-rear direction, and a joining strength of a front portion side is lower than a joining strength of a rear portion side at the joined portion in the front-rear direction.

According to the configuration above, the front side of the suspension arm can be cut off from the subframe at the time of a small overlap collision by reducing the joining strength on the front portion side of the joined portion in the front-rear direction of the front arm portion with respect to the axially supporting portion on the subframe side without causing the complication of the structure and the formability.

In one embodiment of the present disclosure, the front arm portion of the suspension arm has a base end that is axially supported by a vehicle-width-direction outer end of a mounting bracket joined to the subframe, and a joining strength of a joined portion in the front-rear direction of the base end of the mounting bracket with respect to the subframe is lower than a joining strength of a joined portion in the up-down direction.

According to the configuration above, the base end of the front arm portion is axially supported by the vehicle-width-direction outer end of the mounting bracket, and a clearance is set between the axially supporting position and the subframe. Therefore, as compared to a structure in which the base end of the front arm portion is axially supported in the subframe, a large force is applied to the mounting bracket at the time of a collision. As a result, the front side of the suspension arm can be easily cut off and the cutting off can be facilitated at the time of a small overlap collision.

In one embodiment of the present disclosure, at the joined portion in the front-rear direction of the mounting bracket joined to the subframe, a front portion side is intermittently joined to the subframe and a rear portion side is continuously joined to the subframe.

According to the configuration above, the separation is facilitated at the time of a small overlap collision by the intermittent joining on the front portion side, and the joining strength can be maintained by the continuous joining on the rear portion side. In other words, the securing of the joining strength of the mounting bracket and the facilitation of the separation of the mounting bracket at the time of a small overlap collision can be compatible.

In one embodiment of the present disclosure, a joined portion in the vehicle width direction and the joined portion in the up-down direction of the mounting bracket joined to the subframe are continuous. According to the configuration above, the joined portion in the vehicle width direction and the joined portion in the up-down direction described above are continuous, and hence the joining strength of the mounting bracket with respect to the subframe can be secured and the supporting rigidity of the suspension arm can be improved.

In one embodiment of the present disclosure, the mounting bracket includes a lower surface portion joined to a lower surface portion of the subframe at the joined portion in the front-rear direction, and a front surface portion positioned on at least a front portion of the lower surface portion, and the front surface portion is joined to an outer surface portion of the subframe at a front-surface-portion-side joined portion extending in the up-down direction.

According to the configuration above, the front surface portion is joined to the outer surface portion of the subframe at the front-surface-portion-side joined portion extending in the up-down direction, and hence the reduction of the joining strength due to the intermittent joining can be complemented. The front-surface-portion-side joined portion extending in the up-down direction improves the joining strength in the up-down direction. Meanwhile, the front-surface-portion-side joined portion extending in the up-down direction has a weak strength in a direction of peeling off the mounting bracket at the time of a small overlap collision, and the separation property is not adversely affected.

In one embodiment of the present disclosure, the rear arm portion of the suspension arm is axially supported by a second mounting bracket coupled to the subframe, and the mounting bracket has a coupling strength with respect to the subframe that is lower than a coupling strength of the second mounting bracket.

According to the configuration above, the front side of the suspension arm can be made to be rotationally movable in an easy manner with use of the rear side of the suspension arm as a fulcrum at the time of a small overlap collision only by adjusting the coupling strength of the mounting bracket with respect to the subframe.

According to the present disclosure, such an effect that the front side of the suspension arm can be cut off from the subframe at the time of a small overlap collision without causing the complication of the structure and the formability is provided.

DETAILED DESCRIPTION

Cutting off a front side of a suspension arm from a subframe at the time of a small overlap collision without causing the complication of the structure and the formability is attained by a structure of a front suspension apparatus. In the front suspension apparatus, a suspension arm from which a front wheel is suspended is provided, a front arm portion and a rear arm portion of the suspension arm are axially supported by axially supporting portions of a subframe, the axially supporting portion for the front arm portion is joined to the subframe at a joined portion extending in a vehicle width direction, a joined portion extending in an up-down direction, and a joined portion extending in a front-rear direction, and the joined portion in the front-rear direction has a joining strength that is lower than a joining strength of the joined portion in the up-down direction.

Figure 1:
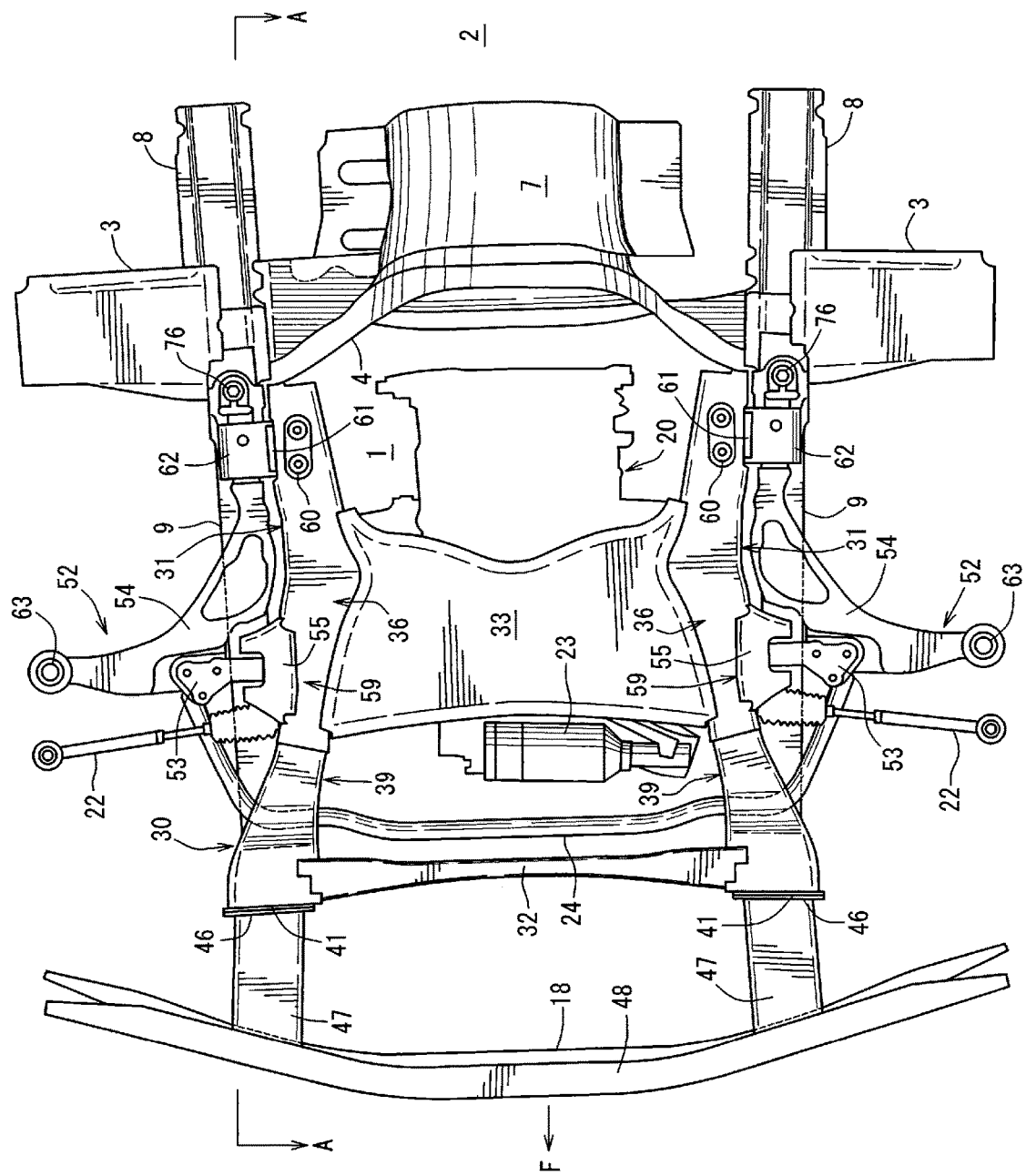
FIG. 1 is a bottom view of a front vehicle-body structure including a front suspension apparatus of the present disclosure.
Figure 2:
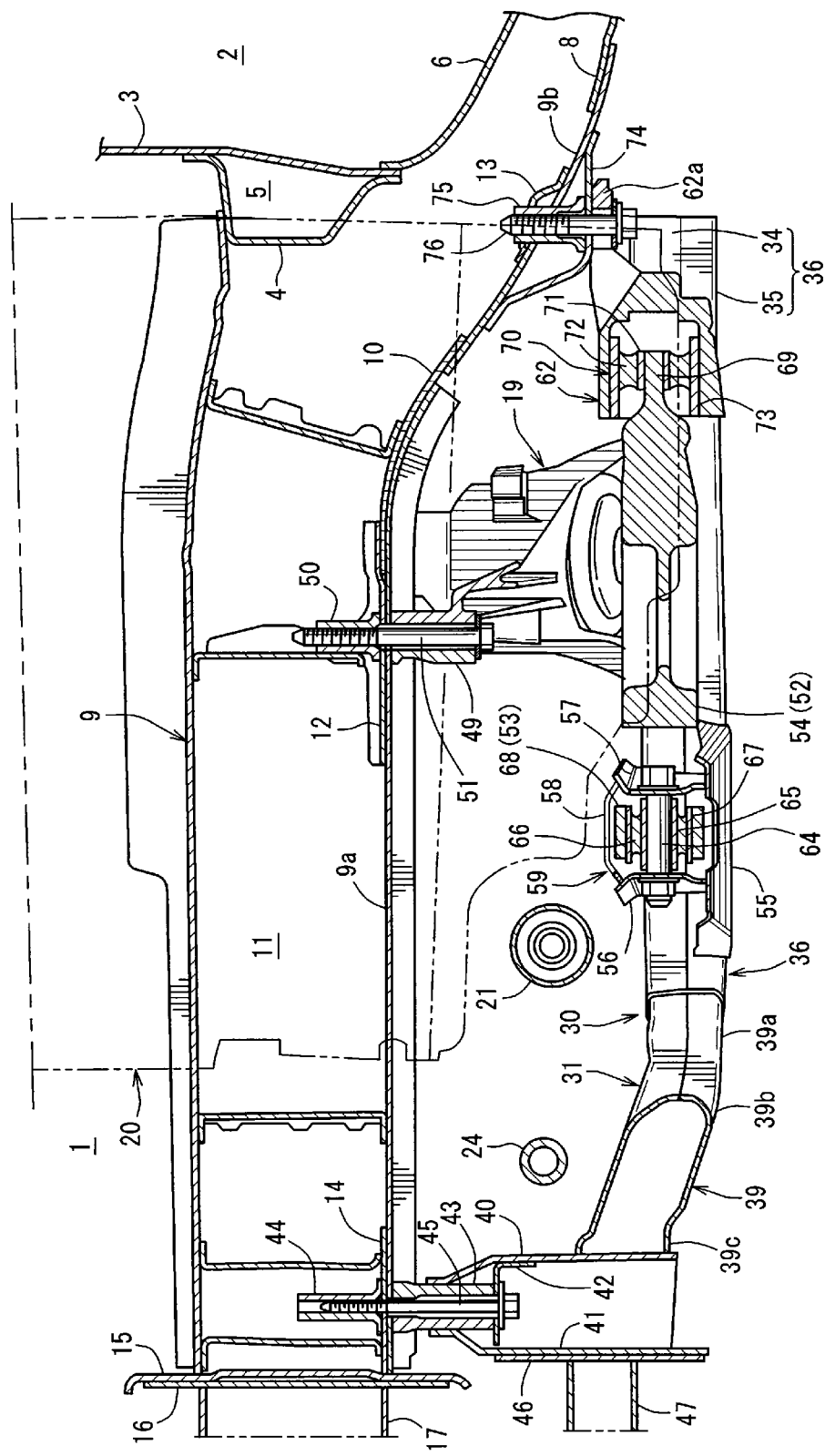
FIG. 2 is an arrow cross-sectional view of a main part taken along line A-A in FIG. 1.
Figure 3:
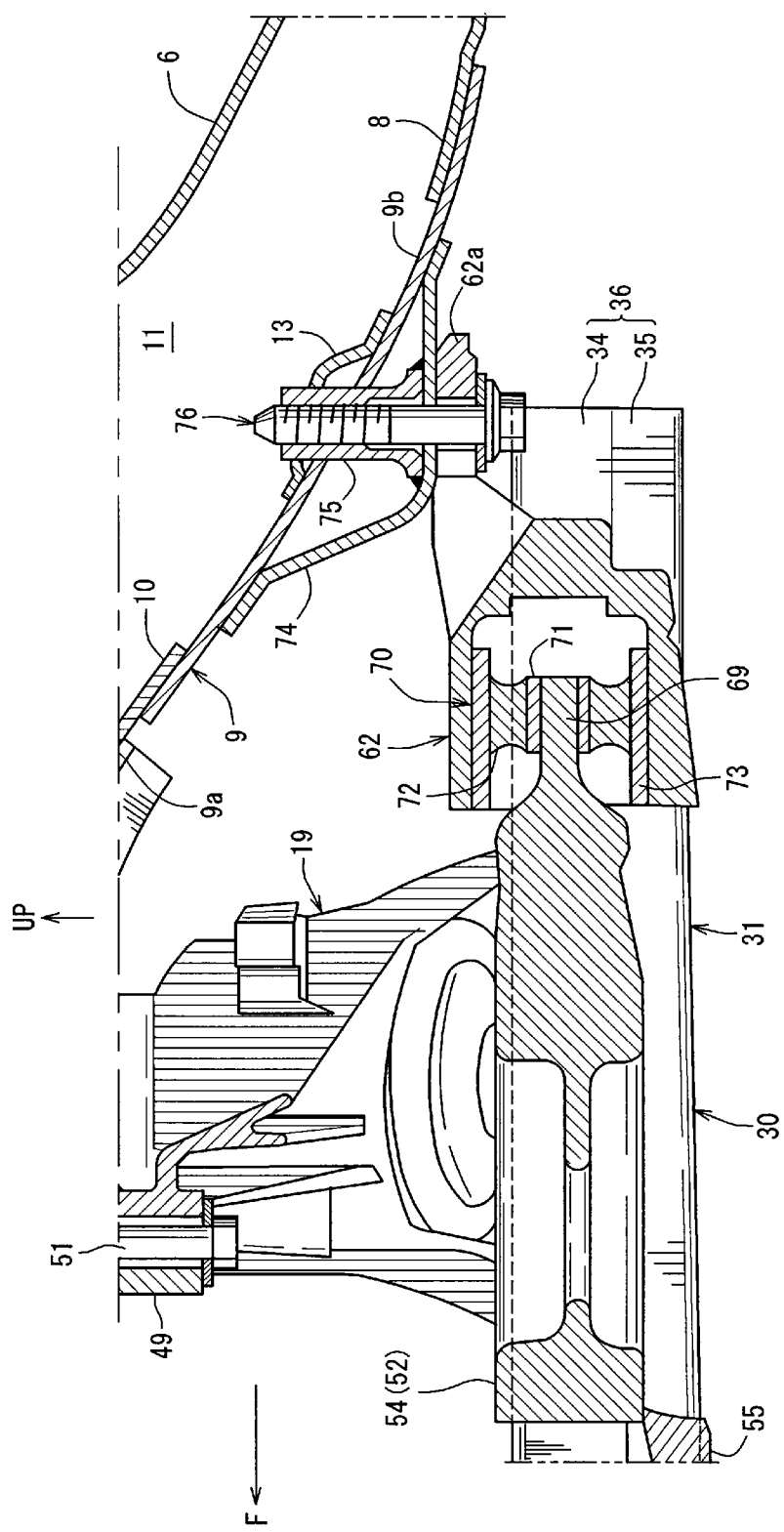
FIG. 3 is a partially-enlarged cross-sectional view of FIG. 2.
Figure 4A:
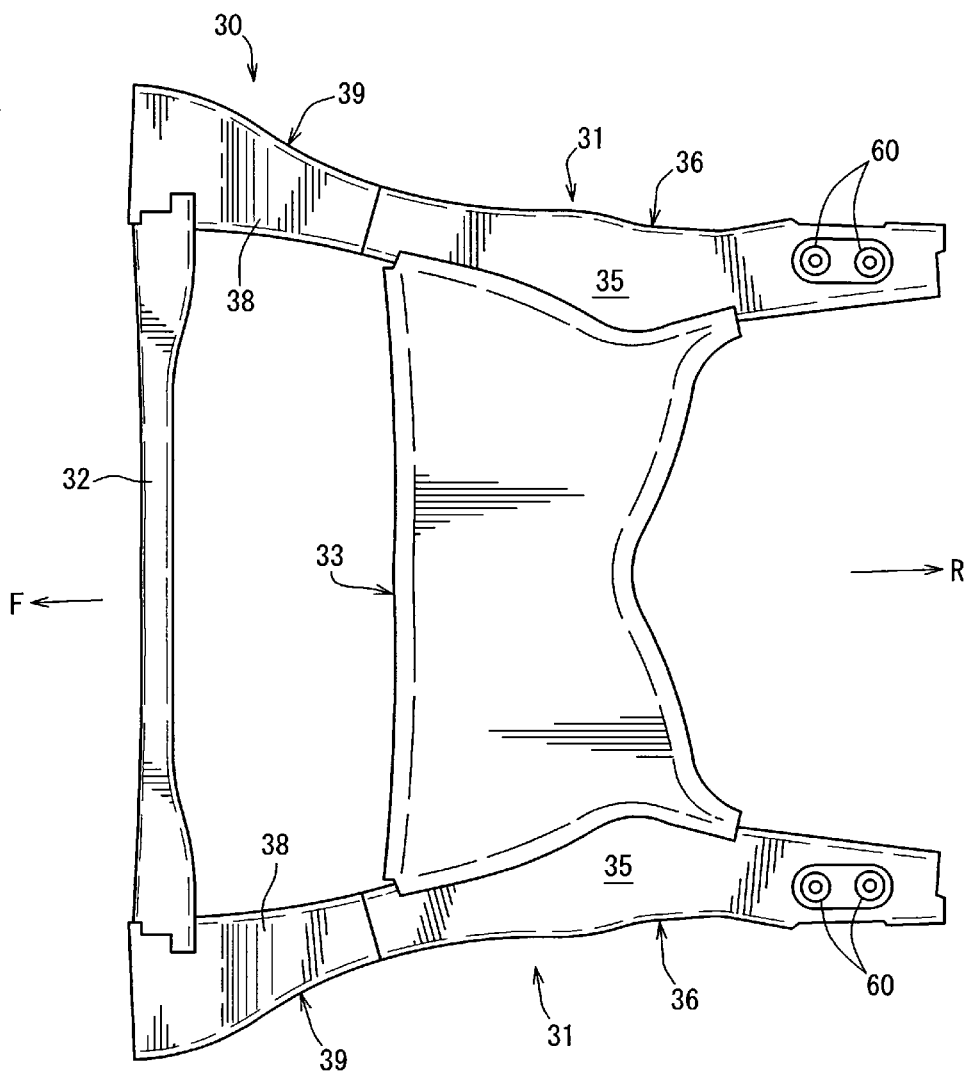
FIG. 4A is a bottom view of a subframe and FIG. 4B is a side view of the subframe.
Figure 4B:
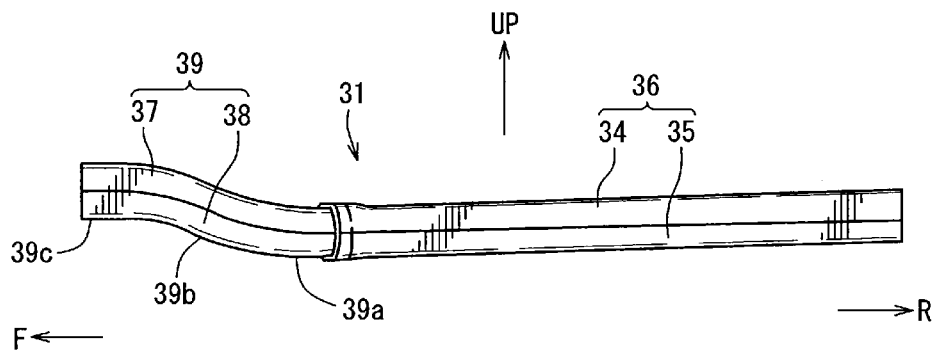
Figure 5:
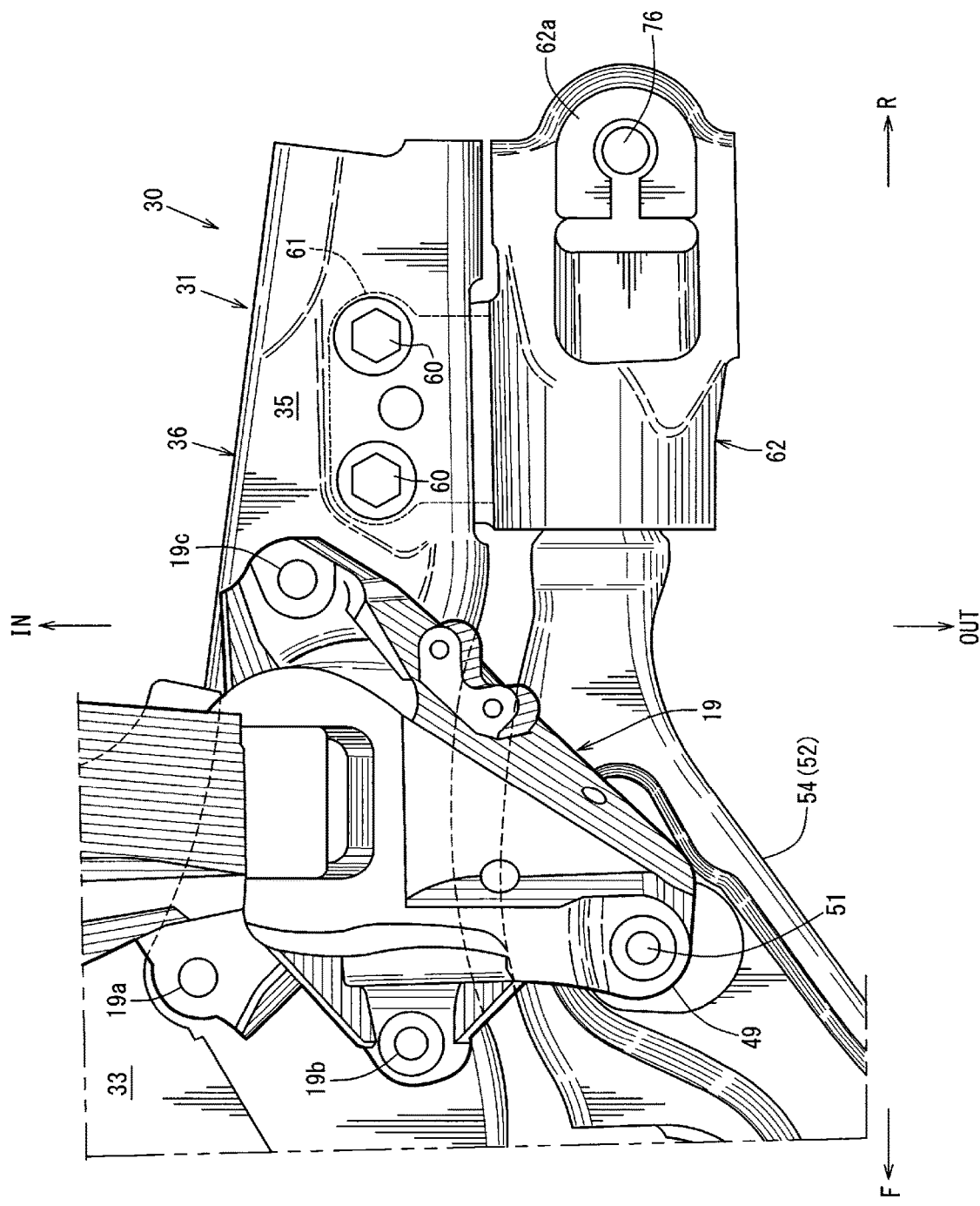
FIG. 5 is a plan view illustrating a mounting structure of a rear arm portion with respect to the subframe.

One embodiment of the present disclosure is described in detail with reference to the following drawings below. The drawings illustrate a front suspension apparatus. FIG. 1 is a bottom view of a front vehicle-body structure including the front suspension apparatus, FIG. 2 is an arrow cross-sectional view of a main part of FIG. 1 taken along line A-A, and FIG. 3 is a partially-enlarged cross-sectional view of FIG. 2. FIG. 4A is a bottom view of a subframe, FIG. 4B is a side view of the subframe, and FIG. 5 is a plan view illustrating a mounting structure of a rear arm portion with respect to the subframe.

As illustrated in FIG. 1 and FIG. 2, a dash lower panel 3 that separates an engine room 1 (however, a motor room for a case of an electrically driven vehicle) and a vehicle interior 2 from each other in the front-rear direction is provided. A dash cross member 4 extending in the vehicle width direction is joined and fixed to a front surface portion of the dash lower panel 3. A closed cross-section portion 5 extending in the vehicle width direction is formed between the dash cross member 4 and the dash lower panel 3 described above.

As illustrated in FIG. 2, a floor panel 6 forming a floor surface of the vehicle interior 2 is provided on a lower portion of the dash lower panel 3 described above in a continuous manner. As illustrated in FIG. 1, a tunnel portion 7 protruding into the vehicle interior 2 is provided on a central portion of the dash lower panel 3 and the floor panel 6 described above in the vehicle width direction.

As illustrated in FIG. 1, floor frames 8 serving as vehicle body rigidity members extending in the vehicle front-rear direction are joined and fixed to a lower portion of the floor panel 6. As illustrated in FIG. 1 and FIG. 2, front side frames 9 extending to the vehicle front side from the dash lower panel 3 and the dash cross member 4 described above are provided. The front side frames 9 are vehicle body strengthening members extending in the vehicle front-rear direction on both of left and right sides of the engine room 1.

As illustrated in FIG. 2, each of the front side frames 9 is formed so to be separated into a front frame portion 9a and a rear frame portion 9b. A rear portion of the front frame portion 9a and a front portion of the rear frame portion 9b are connected to each other by a connecting frame 10. As illustrated in FIG. 2, each of the front side frames 9 described above includes a closed cross-section portion 11 extending in the vehicle front-rear direction. In the closed cross-section portion 11, a place between an intermediate portion of the front frame portion 9a in the front-rear direction and a front portion of the connecting frame 10 is reinforced by a reinforcement 12.

As illustrated in FIG. 2, a reinforcement 13 is provided on a surface of the rear frame portion 9b of the front side frame 9 on the closed cross-section portion 11 side thereof so as to correspond to a fastening position of a rear portion (in detail, a rear portion of a rear arm portion mounting bracket 62) of a subframe 30 described below.

As illustrated in FIG. 2, a reinforcement 14 is also provided on a surface of a front end of the front frame portion 9a of the front side frame 9 on the closed cross-section portion 11 side thereof so as to correspond to a fastening position of a front portion of the subframe 30 described below.

As illustrated in FIG. 2, a main crash can 17 is mounted on a front end of the front side frame 9 via a set plate 15 and a mounting plate 16. As illustrated in FIG. 1, a main bumper beam 18 extending in the vehicle width direction is mounted between the pair of left and right main crash cans 17 and 17.

As illustrated in FIG. 1, the subframe 30 (in detail, a front subframe) is disposed on lower portions of the pair of left and right front side frames 9 and 9. As illustrated in FIG. 2, the subframe 30 is fastened to and supported by lower surface portions of the front side frames 9 with use of the plurality of fastening members (see bolts 45, 51, and 76) described below. The subframe 30 supports an engine 20 that is a vehicle driving apparatus via a mounting bracket 19 in a mounting manner. As illustrated in FIG. 5, the mounting bracket 19 is mounted on the subframe 30 with use of a plurality of mounting portions 19a, 19b, and 19c. In this embodiment, the engine 20 described above is disposed in a vertically installed manner so that a cylinder array is placed along the vehicle front-rear direction.

As illustrated in FIGS. 4A and 4B in a manner in which only the subframe 30 is extracted, the subframe 30 includes a pair of left and right front-rear frames 31 and 31 extending in the vehicle front-rear direction, a transverse member 32, and a center member 33. The transverse member 32 connects front ends of the pair of left and right front-rear frames 31 and 31 to each other in the vehicle width direction. The center member 33 connects intermediate portions of the pair of left and right front-rear frames 31 and 31 in the longitudinal direction to each other in the vehicle width direction.

The transverse member 32 described above has a closed cross-section portion extending in the vehicle width direction by a combination of an upper member and a lower member. The center member 33 described above also has a closed cross-section portion extending in the vehicle width direction by a combination of an upper member and a lower member.

As illustrated in FIG. 4B, each of the front-rear frames 31 described above includes a body 36 extending in the vehicle front-rear direction, and an extending portion 39 extending from the body 36 to the front side. The body 36 described above has a closed cross-section portion extending in the vehicle front-rear direction by a combination of an upper member 34 and a lower member 35. The extending portion 39 described above has a closed cross-section portion extending in the vehicle front-rear direction by a combination of an upper member 37 and a lower member 38.

As illustrated in FIGS. 4A and 4B, the extending portion 39 described above extends from a front end of the body 36 to the vehicle front side. The extending portion 39 includes a rear horizontal portion 39a formed to be substantially horizontal, an inclined portion 39b extending from a front end thereof toward the upper front side, and a front horizontal portion 39c horizontally extending from a front end thereof to the vehicle front side.

As illustrated in FIG. 2, a rear end of the front horizontal portion 39c is disposed so as to be positioned to be closer to the vehicle front side than a front end of the engine 20 disposed in a vertically installed manner. As a result, at the time of a vehicle frontal collision such as a full-overlap collision, a front portion of the subframe 30 that is closer to the front side than the engine 20 is bent into a Z-shape in vehicle side view, to thereby absorb collision energy.

The magnitude relationship of the strengths between the upper members 34 and 37 and the lower members 35 and 38 illustrated in FIG. 4B is set as follows. Put plainly, the strength of the lower member 38 of the extending portion 39 is relatively the lowest, and the strength of the upper member 37 of the extending portion 39 is set to be higher than the strength of the lower member 38. The strengths of the upper member 34 and the lower member 35 of the body 36 are set to be even higher than the strength of the upper member 37. Note that the strengths of the upper member 34 and the lower member 35 of the body 36 are set to be equal. The magnitude relationship of the strengths as above can be set as described above in accordance with the selection of the material forming the members and the plate thickness thereof. By the magnitude relationship of the strengths described above, the Z-shaped bending of the front portion of the subframe 30 in a vehicle side view at the time of a vehicle frontal collision is achieved in an even more secure manner.

As illustrated in FIG. 2, a pair of front and rear mounting members 40 and 41 are joined and fixed to a front end of the extending portion 39 forming the front-rear frame 31 of the subframe 30. The mounting members 40 and 41 extend from the front end of the extending portion 39 to the upper side, and an L-shaped bracket 42 is joined and fixed to a front surface portion of the mounting member 40 on the rear side.

A cylindrical shaft-like spacer 43 is vertically fixed to an upper surface portion of the bracket 42 described above, upper ends of the mounting members 40 and 41 described above are caused to abut against the outer periphery of the spacer 43, and the outer periphery of the spacer 43 and the upper ends of the mounting members 40 and 41 described above are fixed to each other by welding.

As illustrated in FIG. 2, a weld nut 44 is vertically fixed to the upper surface of the reinforcement 14 of the front side frame 9 facing the spacer 43 described above in the up-down direction. The front portion of the subframe 30 is mounted on the front side frame 9 with use of a bolt 45 serving as a fastening member screwed into the weld nut 44 described above via the spacer 43 from the lower side of the bracket 42.

As illustrated in FIG. 1 and FIG. 2, sub crash cans 47 are mounted on the front portion of the mounting member 41 on the front side via mounting plates 46, and a sub bumper beam 48 extending in the vehicle width direction is mounted between the pair of left and right sub crash cans 47 and 47.

As illustrated in FIG. 2, on the mounting bracket 19 described above, a cylindrical shaft-like spacer 49 extending from an outer portion thereof in the vehicle width direction to the upper side is formed. A weld nut 50 is vertically fixed to the upper surface of the reinforcement 12 of the front side frame 9 facing the spacer 49 in the up-down direction.

An intermediate portion of the subframe 30 in the front-rear direction is mounted on the front side frame 9 via the mounting bracket 19 with use of a bolt 51 serving as a fastening member screwed into the weld nut 50 described above via the spacer 49 from the lower side of the spacer 49 described above.

Incidentally, as illustrated in FIG. 1, suspension arms 52 (hereinafter simply abbreviated to lower arms 52) from which the front wheels are suspended are provided. The subframe 30 described above supports the engine 20 in a mounting manner, and axially supports the lower arms 52. Each of the lower arms 52 described above is an A-type arm obtained by integrally forming a front arm portion 53 made by aluminum die casting and a rear arm portion 54 made by aluminum die casting.

As illustrated in FIG. 2, a front arm portion mounting bracket 59 formed by a lower bracket 55, a front bracket 56, a rear bracket 57, and an upper bracket 58 is joined and fixed to the body 36 of the front-rear frame 31 in the subframe 30 described above. A base end of the front arm portion 53 is axially supported by the front arm portion mounting bracket 59 serving as an axially supporting portion.

As illustrated in FIG. 1 and FIG. 5, a connecting bracket 61 is mounted on a rear portion of the body 36 of each of the front-rear frames 31 with use of fastening members 60 such as a bolt and a nut, and the rear arm portion mounting bracket 62 made by aluminum die casting is connected to the connecting bracket 61.

A rear portion of the rear arm portion 54 in the lower arm 52 described above is axially supported by the rear arm portion mounting bracket 62 serving as an axially supporting portion.

As illustrated in FIG. 1, the front arm portions 53 described above are arm portions linearly extending in the vehicle width direction. Each of the rear arm portions 54 extends to the vehicle-width-direction outer side so as to curve in an arc shape from a rear portion to a front portion thereof. Knuckle supporting portions 63 are provided on vehicle-width-direction outer ends of the rear arm portions 54. As illustrated in FIG. 1 and FIG. 2, the rear arm portion mounting bracket 62 described above is formed so as to be positioned directly below the rear frame portion 9b of the front side frame 9.

As illustrated in FIG. 2, an inner pivot shaft 64 is mounted between the front bracket 56 and the rear bracket 57 in the front arm portion mounting bracket 59. An arm bush 68 is disposed on the outer periphery of the inner pivot shaft 64 via a cylinder 65, rubber 66, and an external cylinder 67. The arm bush 68 is a bush integrally formed on a base end of the front arm portion 53 described above.

As illustrated in FIG. 2, a pivot shaft 69 extending in the vehicle front-rear direction is integrally formed on a rear end of the rear arm portion 54, and the pivot shaft 69 is supported by the rear arm portion mounting bracket 62 via an arm bush 70.

As illustrated in FIG. 2 and FIG. 3, the arm bush 70 described above includes an inner cylinder 71, rubber 72, and an external cylinder 73. In other words, a rear portion of the rear arm portion 54 of the lower arm 52 is supported by the rear arm portion mounting bracket 62 in which the arm bush 70 is fitted.

As illustrated in FIG. 1 and FIG. 5, the inner side of the rear arm portion mounting bracket 62 in the vehicle width direction is mounted on the body 36 of the front-rear frame 31 of the subframe 30 via the connecting bracket 61. An inner side portion of the connecting bracket 61 described above in the vehicle width direction is fastened to the body 36 with use of the fastening members 60. An outer portion of the connecting bracket 61 in the vehicle width direction abuts against the external cylinder 73 described above via a hole portion (not shown) formed in the rear arm portion mounting bracket 62. The outer portion of the connecting bracket 61 in the vehicle width direction is fixed to the external cylinder 73 by welding.

As illustrated in FIG. 2 and FIG. 3, a rear portion of the subframe 30, in detail, a rear portion 62a of the rear arm portion mounting bracket 62 mounted on the subframe 30 is mounted on a lower portion of the front side frame 9 serving as a vehicle body.

In detail, an upper surface of the rear frame portion 9b of the front side frame 9 facing the rear portion 62a of the rear arm portion mounting bracket 62 described above in the up-down direction is joined and fixed to the reinforcement 13 described above. A subframe mounting seat 74 is joined and fixed to a lower surface of the rear frame portion 9b (see FIG. 2 and FIG. 3).

As illustrated in FIG. 3, a weld nut 75 is fixed to a horizontal portion of the subframe mounting seat 74 described above by welding. The weld nut 75 is vertically provided toward the upper side from the horizontal portion of the subframe mounting seat 74, and the weld nut 75 is provided so as to protrude to a place above the reinforcement 13 via the rear frame portion 9b.

The rear portion 62a of the rear arm portion mounting bracket 62 is mounted on the lower portion of the front side frame 9 with use of a bolt 76 (fastening member) screwed into the weld nut 75 via the subframe mounting seat 74 from a place below the rear portion 62a of the rear arm portion mounting bracket 62.

As illustrated in FIG. 3 and FIG. 5, the fastening between the subframe 30 and the fastening member (the fastening between the rear arm portion mounting bracket 62 and the bolt 76) is configured so that the rear portion 62a of the bracket 62 is separated from the bolt 76 when a collision load to the vehicle rear side is applied to the subframe 30 at the time of a full-overlap collision.

Figure 6:
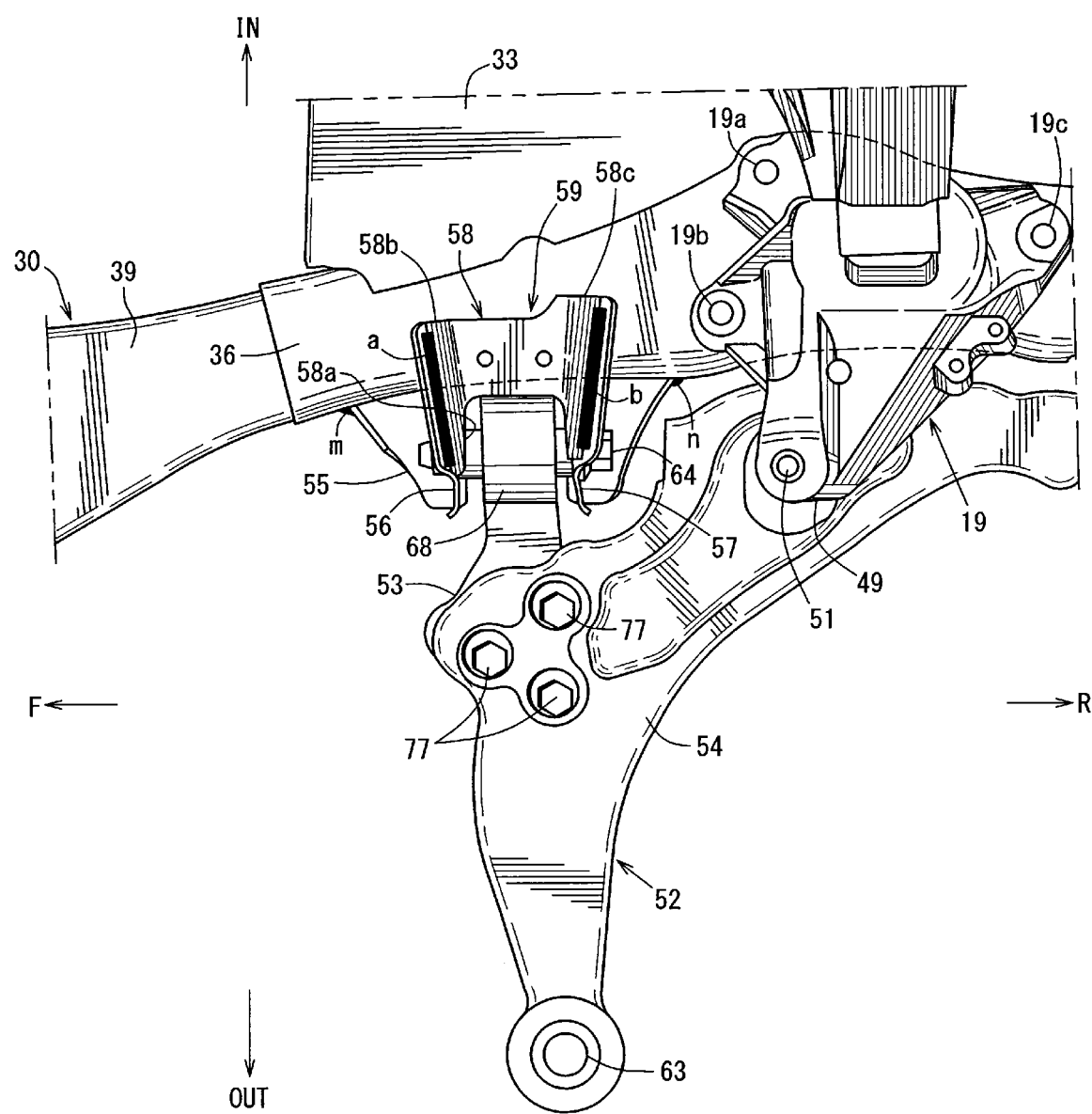
FIG. 6 is a plan view illustrating a mounting structure of a front arm portion with respect to the subframe.
Figure 7:
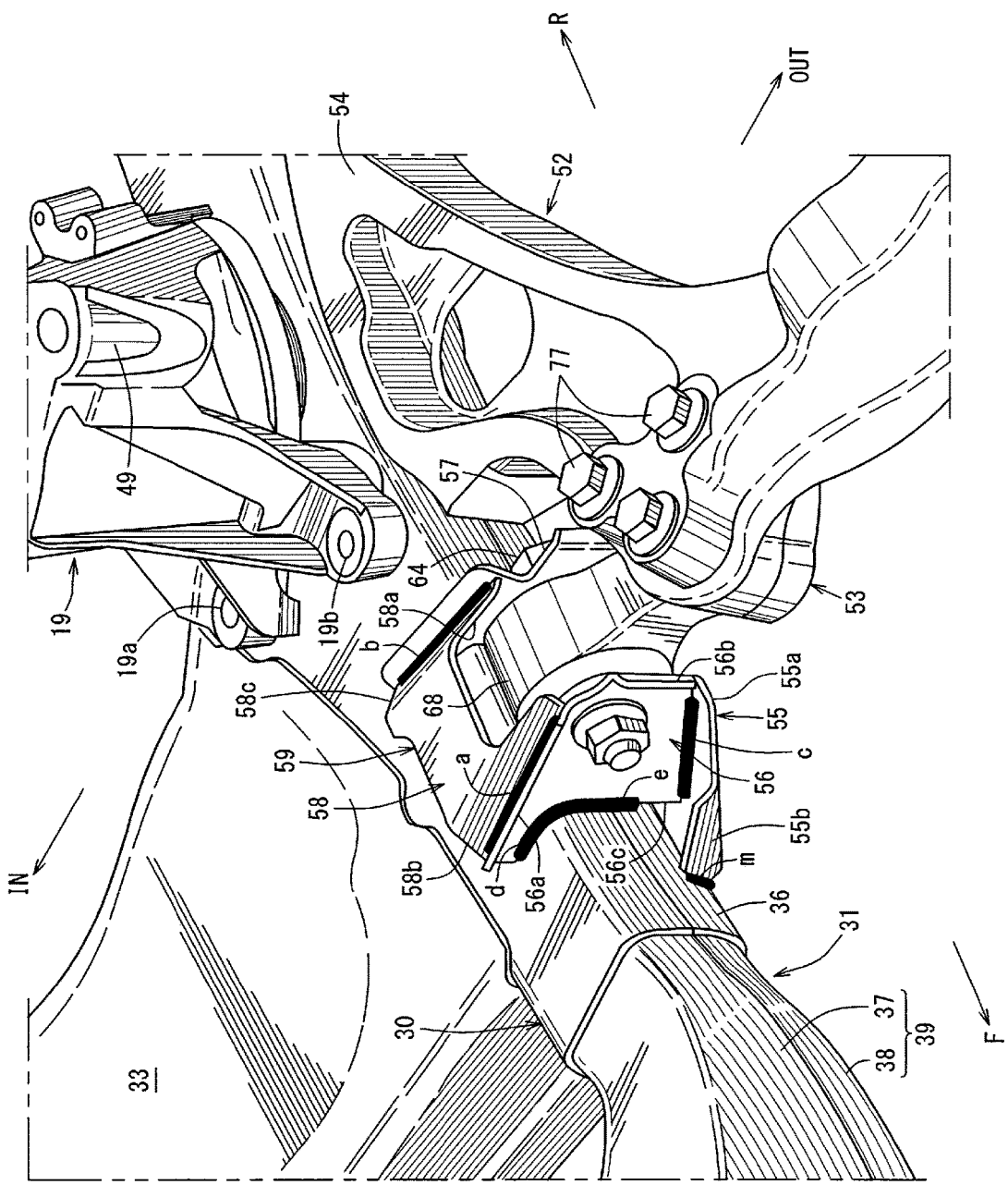
FIG. 7 is a perspective view illustrating the front suspension apparatus in a state of being seen from above.
Figure 8:
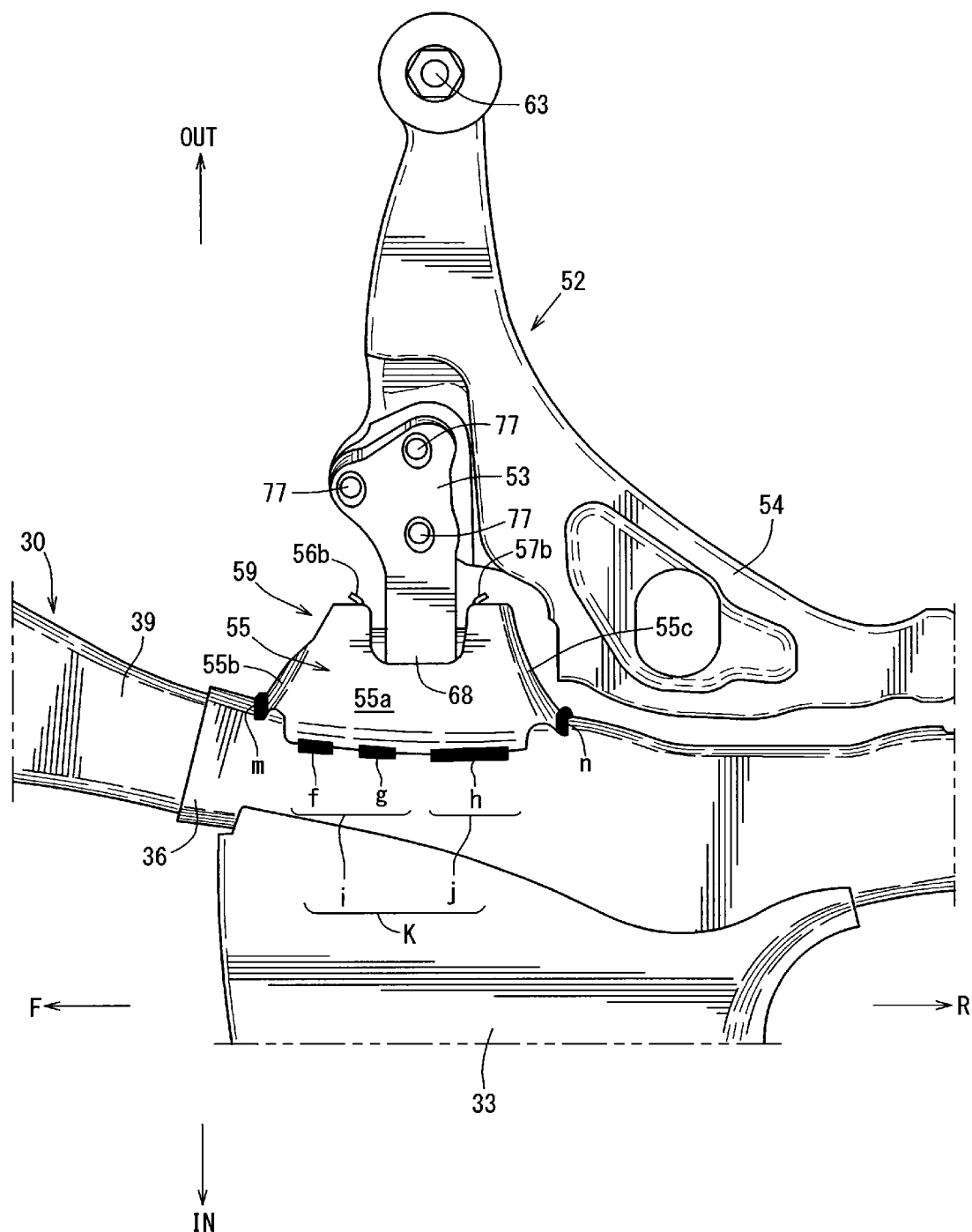
FIG. 8 is a bottom view of FIG. 6.
Figure 9:
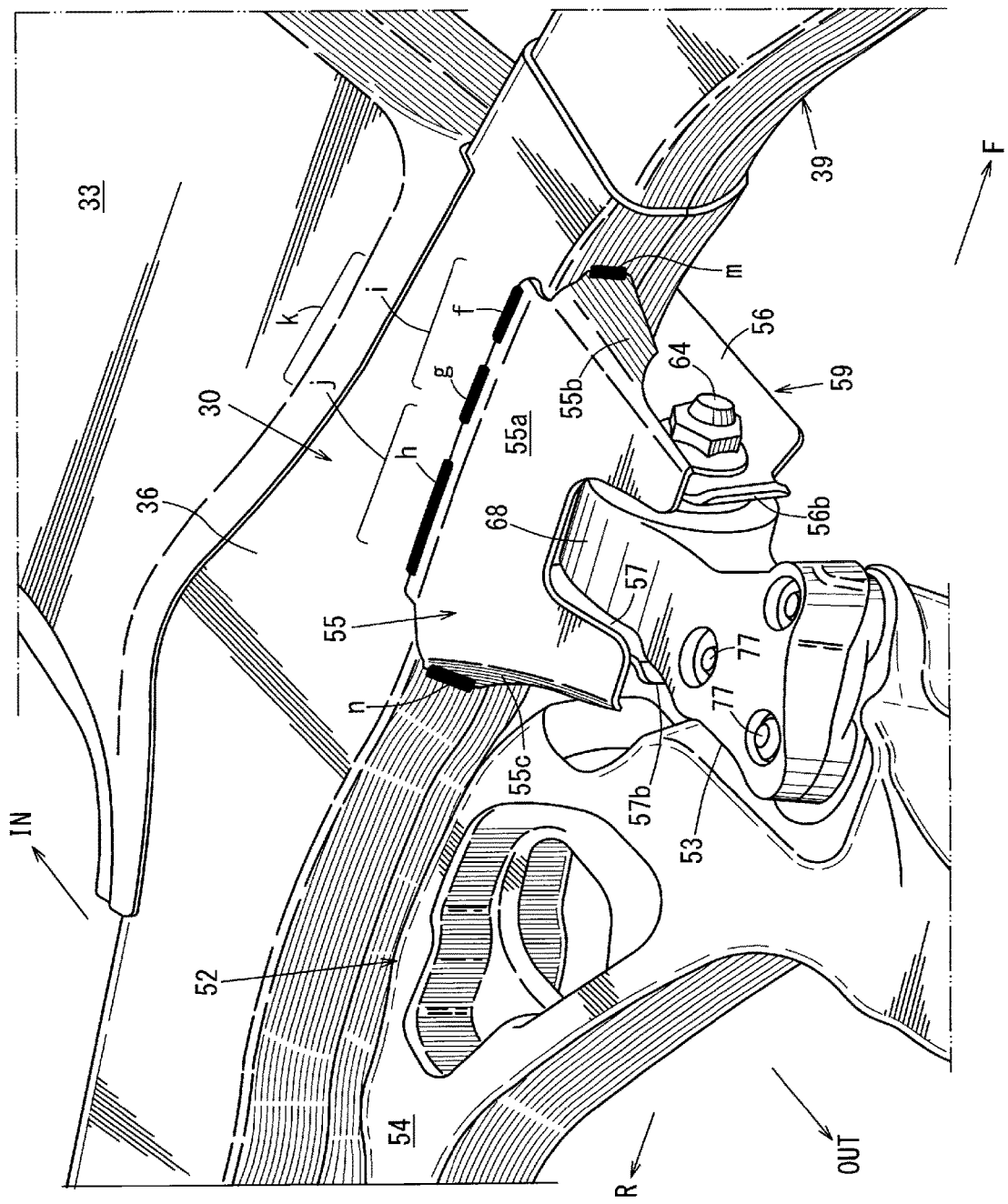
FIG. 9 is a perspective view illustrating the front suspension apparatus in a state of being seen from below.
Figure 10C:
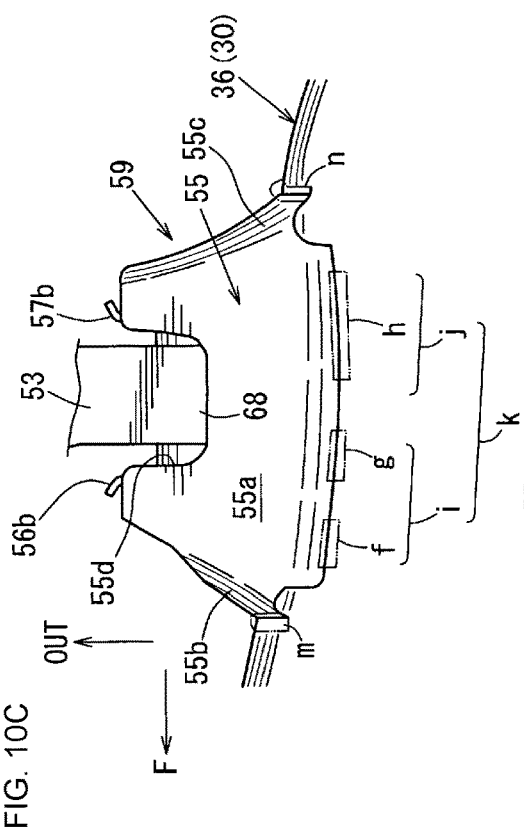
FIG. 10C is a main-part enlarged bottom view of FIG. 8.
Figure 10D:
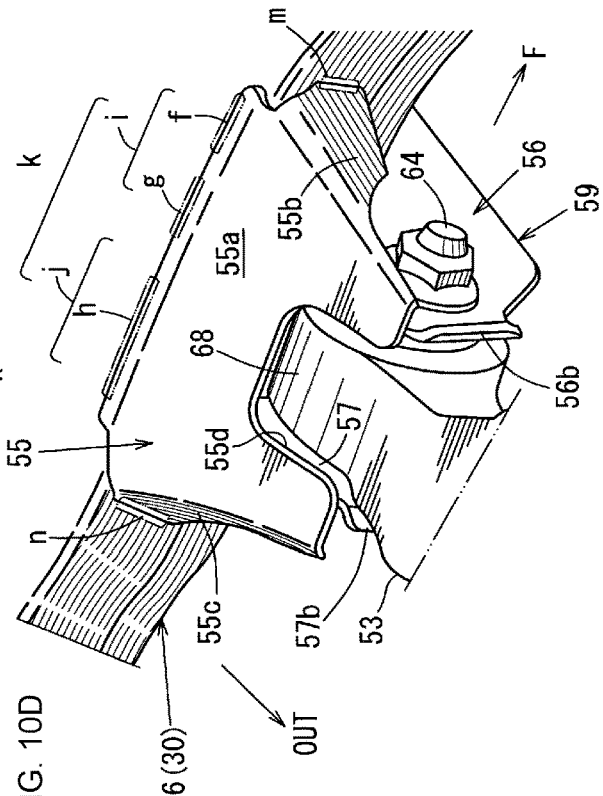
FIG. 10D is a main-part enlarged perspective view of FIG. 9.
Figure 10A:
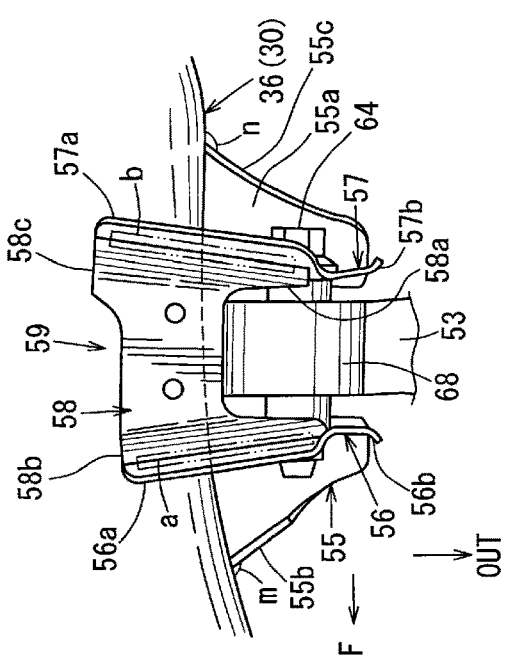
FIG. 10A is a main-part enlarged plan view of FIG. 6.
Figure 10B:
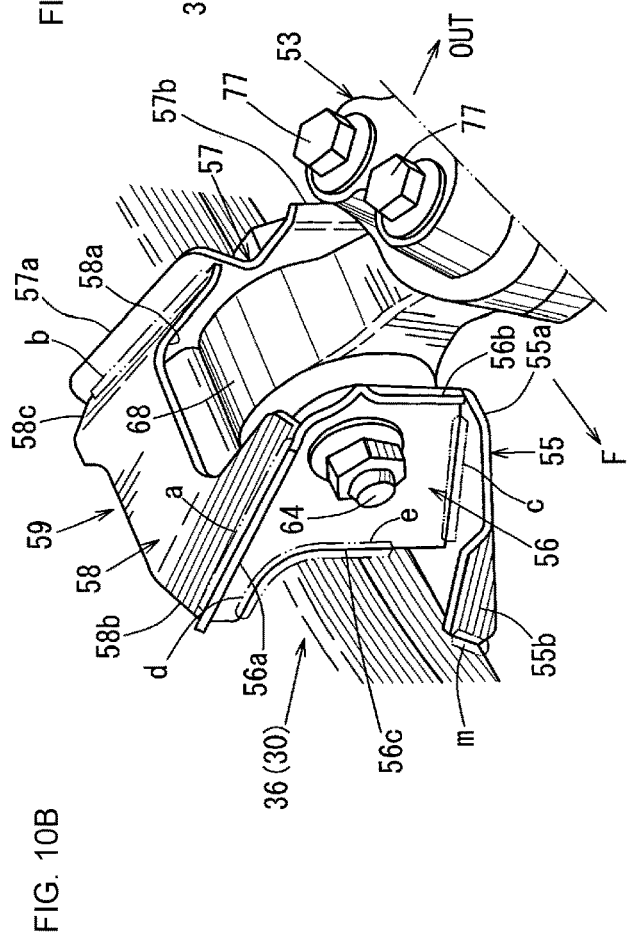
FIG. 10B is a main-part enlarged perspective view of FIG. 7.

FIG. 6 is a plan view illustrating the mounting structure of the front arm portion with respect to the subframe, FIG. 7 is a perspective view illustrating the front suspension apparatus in a state of being seen from above, FIG. 8 is a bottom view of FIG. 6, and FIG. 9 is a perspective view illustrating the front suspension apparatus in a state of being seen from below. FIG. 10A is a main-part enlarged plan view of FIG. 6, FIG. 10B is a main-part enlarged perspective view of FIG. 7, FIG. 10C is a main-part enlarged bottom view of FIG. 8, and FIG. 10D is a main-part enlarged perspective view of FIG. 9.

As illustrated in FIG. 6 to FIG. 10D, a vehicle-width-direction outer end of the front arm portion 53 forming the lower arm 52 is fastened and fixed to the rear arm portion 54 with use of bolts 77 that are a plurality of fastening members. As illustrated in the same drawings, the front arm portion mounting bracket 59 supporting the arm bush 68 serving as a base end of the front arm portion 53 includes the lower bracket 55, the front bracket 56, the rear bracket 57, and the upper bracket 58.

As illustrated in FIG. 7 and FIGS. 10A-10D, the upper bracket 58 includes a cut-out portion 58a in an outer portion in the vehicle width direction facing the arm bush 68. A bent portion 58b bent to the lower side is formed on a front portion of the upper bracket 58, and a bent portion 58c bent to the lower side is formed on a rear portion of the upper bracket 58. By the front and rear bent portions 58b and 58c, the rigidity of the upper bracket 58 is improved. Ends of the bent portions 58b and 58c extending in the vehicle width direction are continuously joined to the front bracket 56 and the rear bracket 57 in the vehicle width direction by arc welding, to thereby form joined portions a and b.

A bent portion 56a bent to the front side and the upper side is formed on an upper end of the front bracket 56, and a bent portion 56b bent to the front side is formed on a vehicle-width-direction outer end of the front bracket 56. By the bent portions 56a and 56b, the rigidity of the front bracket 56 is improved. A lower end of the front bracket 56 described above is continuously joined to the lower bracket 55 in the vehicle width direction by welding, to thereby form a joined portion c.

As illustrated in FIG. 7 and FIGS. 10A-10D, an inverted L-shaped abutting portion 56c along an upper surface portion and a side surface portion of the subframe 30 is formed on an inner end side of the front bracket 56 described above in the vehicle width direction. The abutting portion 56c of the front bracket 56 is continuously joined to the upper surface portion and the side surface portion of the subframe 30 in the vehicle width direction and the up-down direction by welding, to thereby form a joined portion d extending in the vehicle width direction and a joined portion e extending in the up-down direction. The joined portion d in the vehicle width direction and the joined portion e in the up-down direction are continuous.

The rear bracket 57 is formed to be symmetrical to the front bracket 56 in the front-rear direction. In other words, a bent portion 57a bent to the rear side and the upper side is formed on an upper end of the rear bracket 57, and a bent portion 57b bent to the rear side is formed on a vehicle-width-direction outer end of the rear bracket 57. By the bent portions 57a and 57b, the rigidity of the rear bracket 57 is improved. A lower end of the rear bracket 57 described above is continuously joined to the lower bracket 55 in the vehicle width direction by welding, to thereby form a joined portion.

As with the front bracket 56, an inverted L-shaped abutting portion along the upper surface portion and the side surface portion of the subframe 30 is formed on an inner end side of the rear bracket 57 described above in the vehicle width direction. The abutting portion of the rear bracket 57 is continuously joined to the upper surface portion and the side surface portion of the subframe 30 in the vehicle width direction and the up-down direction by welding, and a joined portion extending in the vehicle width direction and a joined portion extending in the up-down direction are formed. The joined portion in the vehicle width direction and the joined portion in the up-down direction are continuous.

As illustrated in FIG. 8 to FIG. 10D, the lower bracket 55 includes a lower surface portion 55a that is substantially trapezoidal in bottom view, a front surface portion 55b formed to be bent to the upper side from a front portion of the lower surface portion 55a, and a rear surface portion 55c formed to be bent to the upper side from a rear portion of the lower surface portion 55a. By integrally forming the front surface portion 55b and the rear surface portion 55c to be bent with respect to the lower surface portion 55a, the rigidity of the lower bracket 55 is improved.

A cut-out portion 55d is formed in an outer portion of the lower surface portion 55a in the vehicle width direction facing the arm bush 68. An inner end of the front surface portion 55b described above in the vehicle width direction is spaced apart from an inner end of the lower surface portion 55a in the vehicle width direction, is positioned on a portion on the front side thereof, and is oriented to the up-down direction. Similarly, an inner end of the rear surface portion 55c described above in the vehicle width direction is spaced apart from the inner end of the lower surface portion 55a in the vehicle width direction, is positioned on a portion on the rear side thereof, and is oriented to the up-down direction.

As illustrated in FIG. 8 to FIG. 10D, the inner end of the lower surface portion 55a in the vehicle width direction is joined to a lower surface portion of the subframe 30 in the front-rear direction by welding, to thereby form a joined portion k extending in the front-rear direction. The inner end of the front surface portion 55b described above in the vehicle width direction is joined to an outer side surface portion of the subframe 30 in the up-down direction by welding, to thereby form a front-surface-portion-side joined portion m extending in the up-down direction. An inner end of the rear surface portion 55c described above in the vehicle width direction is joined to the outer side surface portion of the subframe 30 in the up-down direction by welding, to thereby form a rear-surface-portion-side joined portion n extending in the up-down direction.

In short, the front arm portion mounting bracket 59 serving as the axially supporting portion for the front arm portion 53 is joined to the subframe 30 by the joined portion d extending in the vehicle width direction, the joined portion e extending in the up-down direction, and the joined portion k extending in the front-rear direction.

The joining strength of the joined portion k in the front-rear direction is lower than the joining strength of the joined portion e in the up-down direction. In detail, the joining strength of the joined portion k in the front-rear direction on a vehicle-width-direction inner side end that is the base end of the front arm portion mounting bracket 59 with respect to the subframe 30 is lower than the joining strength of the joined portion e in the up-down direction.

As described above, by reducing the joining strength of the joined portion k in the front-rear direction, the front arm portion mounting bracket 59 axially supporting the front arm portion 53 of the lower arm 52 is formed to be cut off from the subframe 30 at the time of a small overlap collision without causing the complication of the structure and the formability.

As illustrated in FIG. 10C and FIG. 10D, the front arm portion mounting bracket 59 that is the axially supporting portion for the front arm portion 53 is joined to the subframe 30 by the joined portion k extending in the front-rear direction. At the joined portion k in the front-rear direction, the joining strength of a front portion side i is lower than the joining strength of a rear portion side j.

In detail, as illustrated in FIG. 10C and FIG. 10D, at the joined portion k in the front-rear direction of the front arm portion mounting bracket 59 joined to the subframe 30, the front portion side i is formed by intermittently joined portions f and g intermittently joined to the subframe 30. The rear portion side j is formed by a continuously joined portion h continuously joined to the subframe 30. In other words, un-joined portions that are not joined by welding are formed between the joined portions f and g and the joined portions g and h.

As described above, by reducing the joining strength of the front portion side i of the joined portion k in the front-rear direction, the front arm portion mounting bracket 59 is formed to be cut off from the subframe 30 at the time of a small overlap collision without causing the complication of the structure and the formability. As illustrated in FIG. 7, the arm bush 68 that is the base end of the front arm portion 53 is axially supported by the vehicle-width-direction outer end of the front arm portion mounting bracket 59 via the inner pivot shaft 64.

As a result, a clearance is provided between an axially supporting position (the position of the arm bush 68) of the front arm portion 53 and the subframe 30. Therefore, as compared to a structure in which the base end of the front arm portion is axially supported in the subframe, a large force is applied to a base section of the front arm portion mounting bracket 59 at the time of a small overlap collision. As a result, the lower arm 52 is easily cut off and the cutting off is facilitated at the time of a small overlap collision.

As illustrated in FIG. 5, the rear arm portion 54 of the lower arm 52 is axially supported by the rear arm portion mounting bracket 62 serving as a second mounting bracket coupled to the subframe 30 via the connecting bracket 61.

The coupling strength of the front arm portion mounting bracket 59 with respect to the subframe 30 by welding is lower than the coupling strength of the rear arm portion mounting bracket 62, that is, the coupling strength obtained by the connecting bracket 61.

As a result, by adjusting the coupling strength (the joining strength by welding) of the front arm portion mounting bracket 59 with respect to the subframe 30, the front side of the lower arm 52 can be rotationally moved in an easy manner using the rear side of the lower arm 52 as a fulcrum at the time of a small overlap collision.

In FIG. 1 and FIG. 2, reference numeral 21 denotes a steering rack portion of a steering apparatus, reference numeral 22 denotes a tie rod, reference numeral 23 denotes an assist motor for power steering, and reference numeral 24 denotes a stabilizer serving as a torsion bar spring provided between the left and right lower arms 52 and 52.

Figure 11:
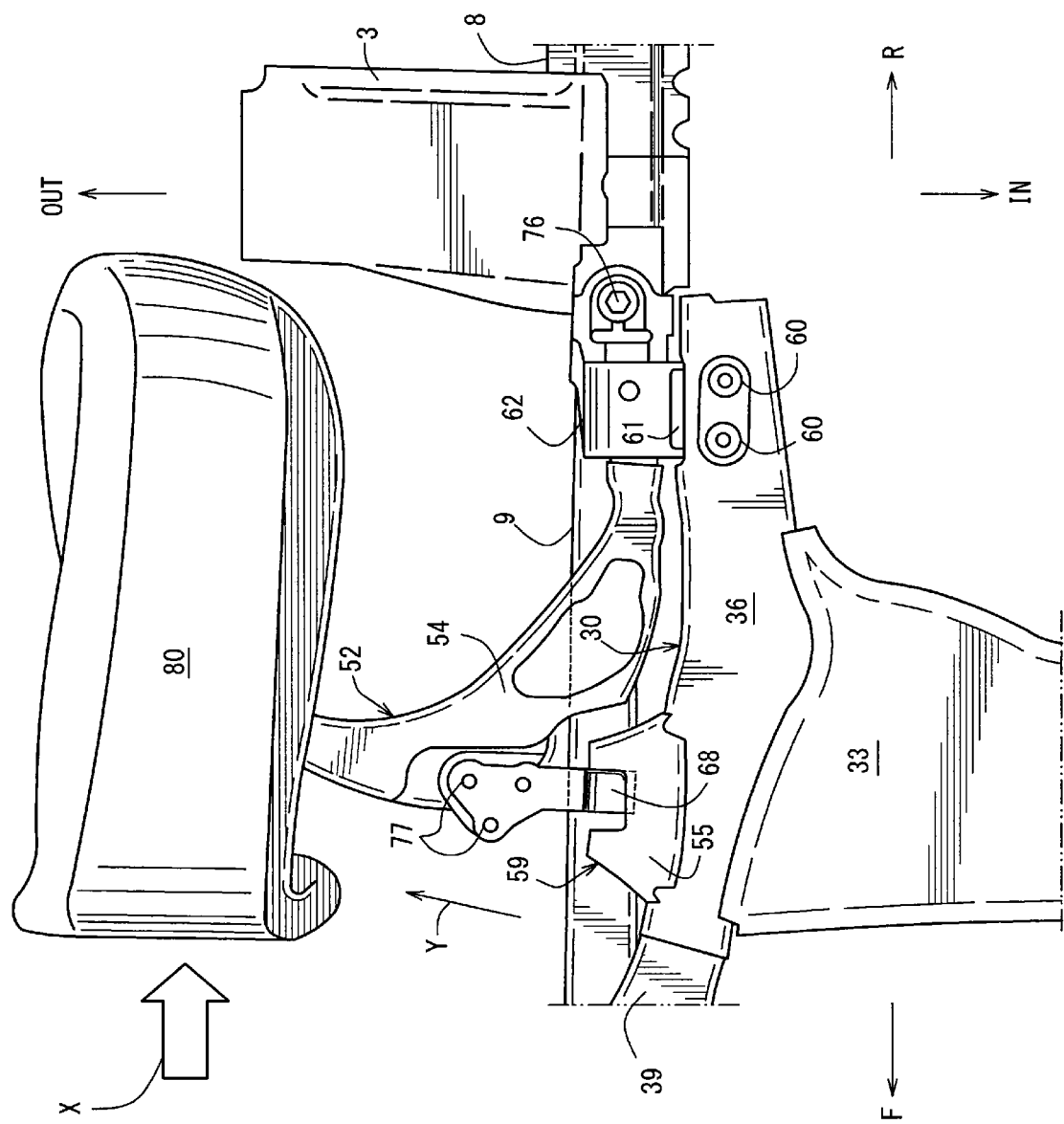
FIG. 11 is a bottom view illustrating a behavior at the time of a small overlap collision.

In the drawings, arrow F indicates the vehicle front side, arrow R indicates the vehicle rear side, arrow IN indicates the inner side in the vehicle width direction, arrow OUT indicates the outer side in the vehicle width direction, and arrow UP indicates the vehicle upper side. FIG. 11 is a bottom view illustrating the behavior at the time of a small overlap collision, and FIG. 12 is a bottom view illustrating the separated state of the front arm portion mounting bracket 59.

Next, the effect of the front suspension apparatus is described with reference to FIG. 10A to FIG. 12. At the time of a small overlap collision, the front wheel 80 is pushed to the vehicle rear side by the collision load indicated by arrow X in FIG. 11. By pushing the front wheel 80 to the rear side, an external force is applied to the front arm portion mounting bracket 59 via the lower arm 52, and the front arm portion mounting bracket 59 is pulled to the outer side and the rear side as indicated by arrow Y.

Figure 12:
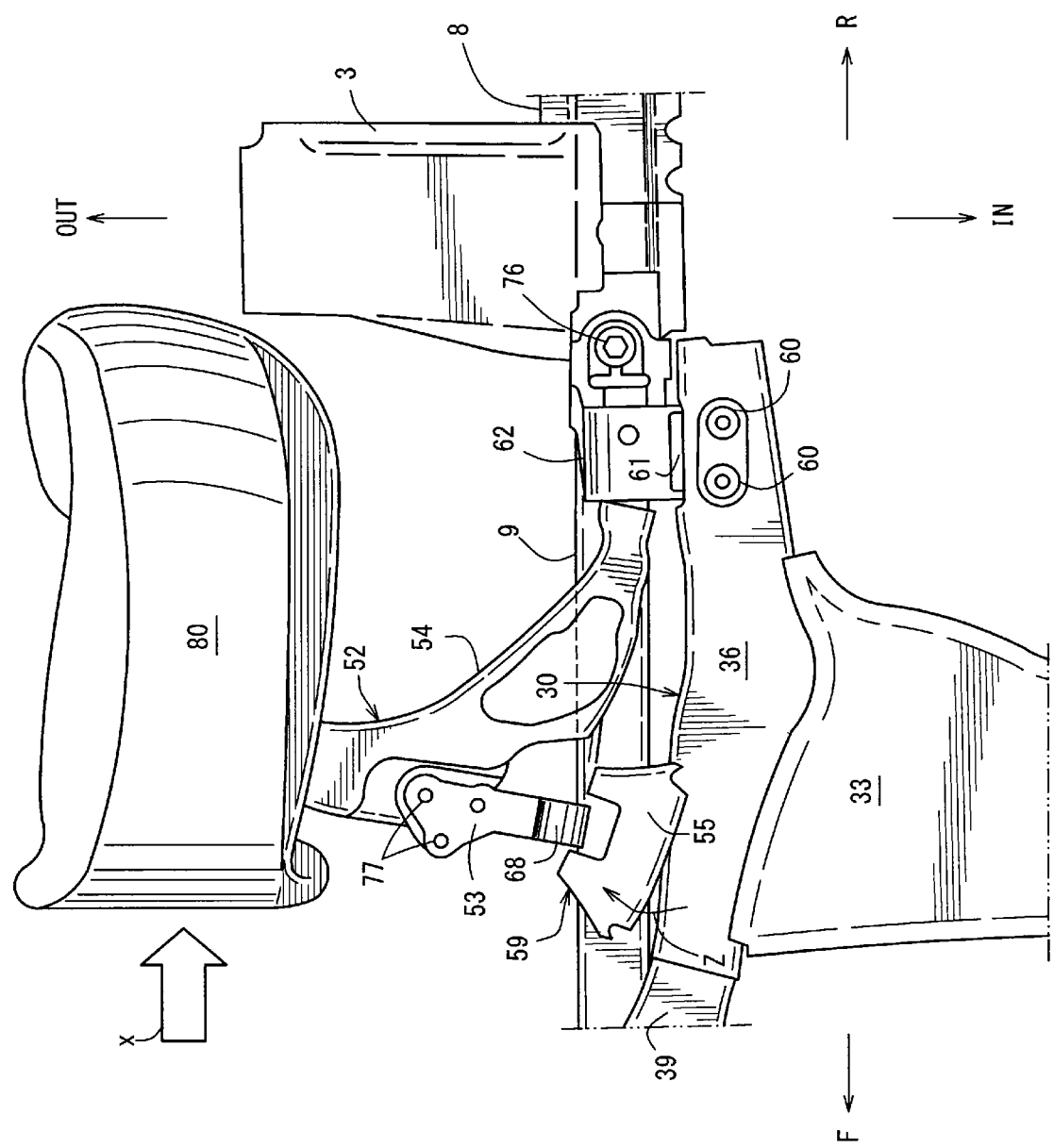
FIG. 12 is a bottom view illustrating a separated state of a front arm portion mounting bracket.

By the tensile force to the outer side and the rear side described above, at the joined portion k in the front-rear direction of which joining strength is relatively low, the intermittently joined portions f and g on the front portion side i are cut off first and the front-surface-portion-side joined portion m is also cut off as indicated by arrow Z in FIG. 12. Then, the continuously joined portion h on the rear portion side j is cut off and the joined portions d, e, and n are also cut off. As a result, the front arm portion mounting bracket 59 is separated from the subframe 30. When the front arm portion mounting bracket 59 is separated, a knuckle supporting portion 63 (see FIG. 1 and FIG. 8) of the lower arm 52 rotationally moves to the vehicle-width-direction outer side by using the rear arm portion mounting bracket 62 as a fulcrum.

As described above, the front suspension apparatus of the embodiment described above is a front suspension apparatus in which: the lower arm 52 from which the front wheel 80 is suspended is provided; the front arm portion 53 and the rear arm portion 54 of the lower arm 52 are axially supported by the axially supporting portions (see the front arm portion mounting bracket 59 and the rear arm portion mounting bracket 62) of the subframe 30; the axially supporting portion (the front arm portion mounting bracket 59) of the front arm portion 53 is joined to the subframe 30 at the joined portion d extending in the vehicle width direction, the joined portion e extending in the up-down direction, and the joined portion k extending in the front-rear direction; and the joining strength of the joined portion k in the front-rear direction is lower than the joining strength of the joined portion e in the up-down direction (see FIG. 7 to FIG. 10D).

According to this configuration, the front side of the lower arm 52 can be cut off from the subframe 30 at the time of a small overlap collision by reducing the joining strength of the joined portion k in the front-rear direction of the front arm portion 53 with respect to the axially supporting portion (the front arm portion mounting bracket 59) on the subframe 30 side without causing the complication of the structure and the formability.

The front suspension apparatus of the embodiment described above is a front suspension apparatus in which: the lower arm 52 from which the front wheel 80 is suspended is provided; the front arm portion 53 and the rear arm portion 54 of the lower arm 52 are axially supported by the axially supporting portions (see the front and rear mounting brackets 59 and 62) of the subframe 30; the axially supporting portion (the front arm portion mounting bracket 59) of the front arm portion 53 is joined to the subframe 30 at the joined portion k extending in the front-rear direction; and the joining strength of the front portion side i is lower than the joining strength of the rear portion side j at the joined portion k in the front-rear direction (see FIG. 7 to FIG. 10D).

According to this configuration, the front side of the lower arm 52 can be cut off from the subframe 30 at the time of a small overlap collision by reducing the joining strength of the front portion side i in the joined portion k in the front-rear direction of the front arm portion 53 with respect to the axially supporting portion (the front arm portion mounting bracket 59) on the subframe 30 side without causing the complication of the structure and the formability.

In one embodiment of the present disclosure, the front arm portion 53 of the lower arm 52 has a base end (see the arm bush 68) that is axially supported by the vehicle-width-direction outer end of the mounting bracket (the front arm portion mounting bracket 59) joined to the subframe 30, and the joining strength of the joined portion k in the front-rear direction of the base end (see the inner end in the vehicle width direction) of the mounting bracket 59 with respect to the subframe 30 is lower than the joining strength of the joined portion e in the up-down direction (see FIG. 7 to FIG. 10D).

According to this configuration, the base end (the arm bush 68) of the front arm portion 53 is axially supported by the vehicle-width-direction outer end of the mounting bracket 59, and a clearance is set between the axially supporting position and the subframe 30. Therefore, as compared to a structure in which the base end of the front arm portion is axially supported in the subframe, a large force is applied to the base portion of the mounting bracket 59 at the time of a collision. As a result, the front side of the lower arm 52 can be easily cut off and the cutting off can be facilitated at the time of a small overlap collision.

In one embodiment of the present disclosure, at the joined portion k in the front-rear direction of the mounting bracket 59 joined to the subframe 30, the front portion side i is intermittently joined (see the intermittently joined portions f and g) to the subframe 30 and the rear portion side j is continuously joined to the subframe 30 (see the continuously joined portion h) (see FIG. 8 to FIG. 10D).

According to this configuration, the separation is facilitated at the time of a small overlap collision by the intermittent joining on the front portion side i, and the joining strength can be maintained by the continuous joining on the rear portion side j. In other words, the securing of the joining strength of the mounting bracket 59 and the facilitation of the separation of the mounting bracket 59 at the time of a small overlap collision can be compatible.

In one embodiment of the present disclosure, the joined portion d in the vehicle width direction and the joined portion e in the up-down direction of the mounting bracket 59 joined to the subframe 30 are continuous (see FIG. 7). According to this configuration, the joined portion d in the vehicle width direction and the joined portion e in the up-down direction described above are continuous, and hence the joining strength of the mounting bracket 59 with respect to the subframe 30 can be secured and the supporting rigidity of the lower arm 52 can be improved.

In one embodiment of the present disclosure, the mounting bracket 59 includes: the lower surface portion 55a joined to the lower surface portion of the subframe 30 at the joined portion k in the front-rear direction; and the front surface portion 55b positioned on at least the front portion of the lower surface portion 55a, and the front surface portion 55b is joined to the outer surface portion of the subframe 30 at the front-surface-portion-side joined portion m extending in the up-down direction (see FIG. 7 and FIG. 9).

According to this configuration, the front surface portion 55b is joined to the outer surface portion of the subframe 30 at the front-surface-portion-side joined portion m extending in the up-down direction, and hence the reduction of the joining strength (the joining strength obtained by the intermittently joined portions f and g) due to the intermittent joining can be complemented. The front-surface-portion-side joined portion m extending in the up-down direction improves the joining strength in the up-down direction. Meanwhile, the front-surface-portion-side joined portion m extending in the up-down direction has a weak strength in a direction of peeling off the mounting bracket 59 at the time of a small overlap collision, and the separation property is not adversely affected.

In one embodiment of the present disclosure, the rear arm portion 54 of the lower arm 52 is axially supported by the second mounting bracket (the rear arm portion mounting bracket 62) coupled to the subframe 30, and the coupling strength of the mounting bracket 59 with respect to the subframe 30 is lower than the coupling strength of the second mounting bracket (the rear arm portion mounting bracket 62) (see FIG. 5 and FIG. 7 to FIG. 10D).

According to this configuration, the front side of the lower arm 52 can be made to be rotationally movable in an easy manner with use of the rear side of the lower arm 52 as a fulcrum at the time of a small overlap collision only by adjusting the coupling strength of the mounting bracket (the front arm portion mounting bracket 59) with respect to the subframe 30.

Regarding the correspondence between the configuration of the present disclosure and the embodiment described above, the suspension arm of the present disclosure corresponds to the lower arm 52 of embodiment. Similarly, the axially supporting portion corresponds the front arm portion mounting bracket 59 and the rear arm portion mounting bracket 62. The joined portions that are intermittently joined correspond to the intermittently joined portions f and g. The joined portion that is continuously joined corresponds to the continuously joined portion h. The base end of the front arm portion corresponds to the arm bush 68. The mounting bracket corresponds to the front arm portion mounting bracket 59. The second mounting bracket corresponds to the rear arm portion mounting bracket 62. However, the present disclosure is not limited to the configuration of the embodiment described above.

As described above, the present disclosure is useful for a front suspension apparatus in which a suspension arm from which a front wheel is suspended is provided and a front arm portion and a rear arm portion of the suspension arm are axially supported by axially supporting portions of a subframe.

What is claimed is:

1. A front suspension apparatus comprising:
   a suspension arm from which a front wheel is suspended, a front arm portion and a rear arm portion of the suspension arm being axially supported by axially supporting portions of a subframe, wherein
   the axially supporting portion for the front arm portion is joined to the subframe at a joined portion extending in a vehicle width direction, a joined portion extending in an up-down direction, and a joined portion extending in a front-rear direction,
   the joined portion in the front-rear direction has a joining strength that is lower than a joining strength of the joined portion in the up-down direction,
   the front arm portion of the suspension arm has a base end that is axially supported by a vehicle-width-direction outer end of a mounting bracket joined to the subframe, and
   a joining strength of the joined portion in the front-rear direction of the base end of the mounting bracket with respect to the subframe is lower than a joining strength of the joined portion in the up-down direction.

2. The front suspension apparatus according to claim 1, wherein, at the joined portion in the front-rear direction of the mounting bracket joined to the subframe, a front portion side is intermittently joined to the subframe and a rear portion side is continuously joined to the subframe.

3. The front suspension apparatus according to claim 2, wherein the joined portion in the vehicle width direction and the joined portion in the up-down direction of the mounting bracket joined to the subframe are continuous.

4. The front suspension apparatus according to claim 3, wherein
   the mounting bracket includes:
      a lower surface portion joined to a lower surface portion of the subframe at the joined portion in the front-rear direction; and
      a front surface portion positioned on at least a front portion of the lower surface portion, and
   the front surface portion is joined to an outer surface portion of the subframe at a front-surface-portion-side joined portion extending in the up-down direction.

5. The front suspension apparatus according to claim 1, wherein
   the rear arm portion of the suspension arm is axially supported by a second mounting bracket coupled to the subframe, and
   the mounting bracket has a coupling strength with respect to the subframe that is lower than a coupling strength of the second mounting bracket.

6. A front suspension apparatus, comprising:
   a suspension arm from which a front wheel is suspended, a front arm portion and a rear arm portion of the suspension arm being axially supported by axially supporting portions of a subframe, the axially supporting portion for the front arm portion is joined to the subframe at a joined portion extending in a front-rear direction, and a joining strength of a front portion side is lower than a joining strength of a rear portion side at the joined portion in the front-rear direction.

7. The front suspension apparatus according to claim 6, wherein the front arm portion of the suspension arm has a base end that is axially supported by a vehicle-width-direction outer end of a mounting bracket joined to the subframe, and a joining strength of the joined portion in the front-rear direction of the base end of the mounting bracket with respect to the subframe is lower than a joining strength of a joined portion in an up-down direction.

8. The front suspension apparatus according to claim 7, wherein, at the joined portion in the front-rear direction of the mounting bracket joined to the subframe, a front portion side is intermittently joined to the subframe and a rear portion side is continuously joined to the subframe.

9. The front suspension apparatus according to claim 8, wherein a joined portion in a vehicle width direction and the joined portion in the up-down direction of the mounting bracket joined to the subframe are continuous.

10. The front suspension apparatus according to claim 9, wherein the mounting bracket includes:
   a lower surface portion joined to a lower surface portion of the subframe at the joined portion in the front-rear direction; and
   a front surface portion positioned on at least a front portion of the lower surface portion, and the front surface portion is joined to an outer surface portion of the subframe at a front-surface-portion-side joined portion extending in the up-down direction.

11. The front suspension apparatus according to claim 7, wherein the rear arm portion of the suspension arm is axially supported by a second mounting bracket coupled to the subframe, and the mounting bracket has a coupling strength with respect to the subframe that is lower than a coupling strength of the second mounting bracket.

* * * * *